No. 888,817. PATENTED MAY 26, 1908.
C. KAPENOS.
VALVE.
APPLICATION FILED AUG. 17, 1907.

Witnesses
A. H. Rabsag
N. H. Butler

Inventor
Charles Kapenos

By A. C. Everts
Attorneys

UNITED STATES PATENT OFFICE.

CHARLES KAPENOS, OF PITTSBURG, PENNSYLVANIA.

VALVE.

No. 888,817.  Specification of Letters Patent.  Patented May 26, 1908.

Application filed August 17, 1907. Serial No. 389,005.

*To all whom it may concern:*

Be it known that I, CHARLES KAPENOS, a citizen of the United States of America, residing at Pittsburg, in the county of Allegheny and State of Pennsylvania, have invented certain new and useful Improvements in Valves, of which the following is a specification, reference being had therein to the accompanying drawing.

This invention relates to valves, and its object is to provide a duplex valve which will seat by the turning of the valve stem in either direction.

The invention comprises a valve-casing of novel construction, in combination with a valve stem and valves arranged thereon to effect the closing or opening of the valve by either the upward or downward movement of the valve stem.

The construction of the improvement will be fully described hereinafter, in connection with the accompanying drawing which forms a part of this specification, and its features of novelty will be set forth and defined in the appended claims.

Figure 1:
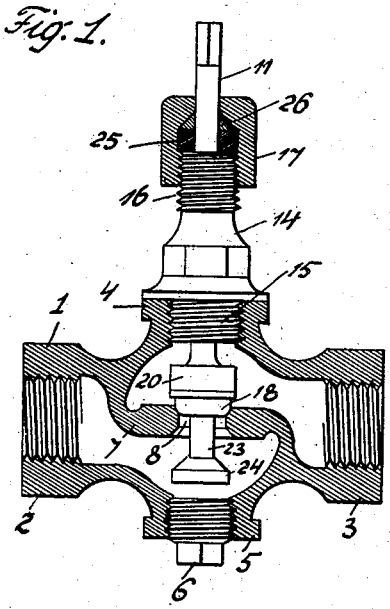
Figure 2:
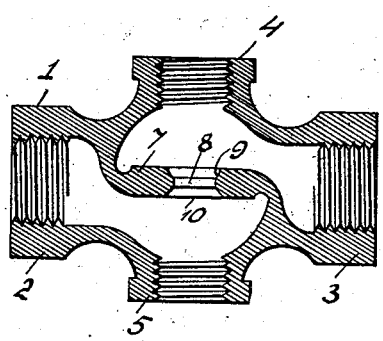
Figure 3:
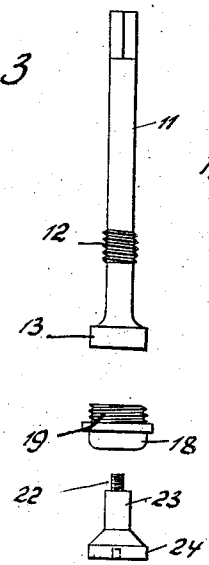
Figure 4:
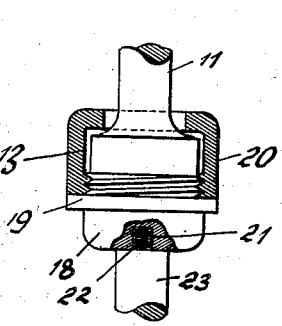
Figure 5:
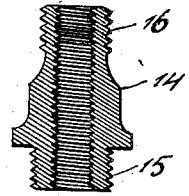

In the drawing:—Figure 1 is a central vertical section of the improvement, Fig. 2 is a similar view of the valve casing, Fig. 3 is an elevation of the valve stem and valves, separated, Fig. 4 is a view partly in section, and partly in elevation of a portion of the valve stem and parts appurtenant thereto, Fig. 5 is a central vertical section of the sleeve through which the valve stem extends.

The reference numeral 1 designates a valve casing, having internally threaded ends 2 and 3 for the attachment of inlet and outlet pipes, a threaded socket 4, and an internally threaded nipple 5 to receive a screw plug 6. The casing 1 is also formed with a partition 7 having a central passage 8, beveled to provide an upper valve-seat 9 and a lower set 10.

The reference numeral 11 designates a valve-stem formed with left-handed screw-threads 12, and at its lower end with a head 13. The valve-stem extends through an internally-threaded sleeve 14, also provided with external threads 15 fitting the socket 4, and with threads 16 adapted to be engaged by a thimble 17.

To the head 13 of the valve stem is secured a valve 18 provided with a threaded flange 19, to be engaged by an internally-threaded coupling 20.

The valve 18 is formed with a threaded socket 21 to receive a threaded pin 22 projecting from a valve 23 tapered as shown at 24. The valve 23 is formed with the tapered portion 24 and with a stem extending upwardly therefrom a distance sufficient to provide the necessary space between the two valves, said stem practically forming a spacing member for the two valves. The lower end of the valve 23 is slotted, as at 23$^a$ to permit of a screw-driver or similar instrument being used to place the valve in position. As will be seen, the two valves when connected together as described, form a substantially unitary structure having their movements under the action of the rod or stem 11 in unison, while the stem 11, although provided for the purpose of imparting all of the movements to the valve structure, is not connected therewith in such form as to cause the valve structure to partake of the rotative movement of the stem 11, except such as might be produced by the frictional engagement of the head 13 and the upper end of valve 18 during the movement of the valves in one direction, or of such frictional engagement of the head 13 with the inner face of the connection 20 when the valves are drawn in the opposite directions. It will therefore be understood that the engagement of the valves and their valve seats is had without the requirement of an actual rotative movement of the valves themselves, the connections between the stem 11 and the valve structure being such as will permit the stem 11 and valve structure to have a rotative movement relative to each other, so that when in actual use, the valve structure moves simply in directions axially of the valves and substantially free from rotative movement, thereby eliminating the rapid wear which is placed on valve faces by the bringing of the valve into contact with its seat by a rotative movement. And the particular construction of the valve structure enables a rapid substitution of parts.

The utility and operation of the valve constructed as hereinbefore described will be readily understood.

The sleeve 17 is provided with a packing 25, and a washer 26. The valve-stem 11 is provided with a squared head 27 to receive a wrench, and the distinguishing characteristic of the improvement is, that the water passage 8 will be closed by the turning of the valve-stem in either direction. In other words, if the valve-stem is screwed down, the valve 18 is seated, and if it is screwed upward, the valve 24 closes the passage 8.

Having now described my invention what I claim as new, is:—

1. In a valve, a valve rod provided at its lower end with a head, a coupling of cup-like form sleeved over the head and extending below the same and provided with interior threads at its lower end, a valve threaded into engagement with said coupling, said valve being imperforate to provide a smooth surface in contact with the face of the head, a valve stem provided with a reduced externally threaded upper end threaded into the lower face of said valve, the reducing of said valve stem at its upper end forming an annular shoulder which abuts against the lower face of the valve, and a valve formed integral with the lower end of said valve stem, whereby the valves will have a positive connection to move in unison and in the same directions.

2. In a valve having two valve seats formed on opposite sides of a partition, a valve stem having a screw-threaded engagement with the valve casing, and a valve member removably secured thereto, the connection of the stem and member permitting a relative rotative movement therebetween, said valve member comprising two opposing valves spaced one from the other and lying on opposite sides of the valve seat partition, said valves being movable as a unitary structure, the lower valve having a stem secured thereto at its upper end and adapted to be removably secured to the upper valve, the length of said latter stem determining the distance between the valves, the upper valve being imperforate to provide a smooth surface in contact with the lower end of the main valve stem.

In testimony whereof I affix my signature in the presence of witnesses.

CHARLES KAPENOS.

Witnesses:
MAX H. SROLOVITZ,
H. C. EVERT,
ADOLPH STREHLAN.